United States Patent
Chernin et al.

(10) Patent No.: US 10,686,828 B2
(45) Date of Patent: Jun. 16, 2020

(54) COMPUTERIZED SYSTEM AND METHOD FOR SECURELY DISTRIBUTING AND EXCHANGING CYBER-THREAT INFORMATION IN A STANDARDIZED FORMAT

(71) Applicant: NC4 Soltra LLC, El Segundo, CA (US)

(72) Inventors: Michael Aharon Chernin, Tampa, FL (US); Mark Clancy, Tampa, FL (US); David Eilken, Glendale, AZ (US); Eric Guerrino, Howell, NJ (US); William Nelson, Leesburg, VA (US)

(73) Assignee: SOLTRA SOLUTIONS, LLC, Tampa, FL (US)

( * ) Notice: Subject to any disclaimer, the term of this patent is extended or adjusted under 35 U.S.C. 154(b) by 325 days.

(21) Appl. No.: 15/098,977

(22) Filed: Apr. 14, 2016

(65) Prior Publication Data

US 2016/0366174 A1     Dec. 15, 2016

Related U.S. Application Data

(60) Provisional application No. 62/149,121, filed on Apr. 17, 2015.

(51) Int. Cl.
*H04L 29/06* (2006.01)
*H04L 29/08* (2006.01)
(Continued)

(52) U.S. Cl.
CPC .......... *H04L 63/1441* (2013.01); *G06F 16/22* (2019.01); *G06F 21/577* (2013.01);
(Continued)

(58) Field of Classification Search
None
See application file for complete search history.

(56) References Cited

U.S. PATENT DOCUMENTS

| | | |
|---|---|---|
| 8,631,068 B1 | 1/2014 | Caldwell et al. |
| 8,914,406 B1 | 12/2014 | Haugsnes et al. |
| (Continued) | | |

FOREIGN PATENT DOCUMENTS

| | | |
|---|---|---|
| WO | 2014120181 A1 | 8/2014 |
| WO | 2015/047437 A1 | 4/2015 |

OTHER PUBLICATIONS

International Search Report and Written Opinion dated Jul. 7, 2016 as received in Application No. PCT/US2016/027516.
(Continued)

*Primary Examiner* — Joseph P Hirl
*Assistant Examiner* — Hassan Saadoun
(74) *Attorney, Agent, or Firm* — Steptoe & Johnson LLP

(57) ABSTRACT

Computerized systems and methods for sharing identified cyber-threat information in a standardized and secure format. The sharing of cyber-threat information assists in preventing malicious actors from replicating successful cyber-attacks by informing potential targets of the methods employed by the malicious actors, and the defensive measures that those targets should to implement to prevent those methods from succeeding. By distributing cyber-threat information in a standardized format, the systems and methods enable participating entities to automatically analyze and implement defensive measures for cyber-threat information shared by any other participating entities. The systems and methods also permit an entity to control which threat information it shares and which other entities it shares it with in a secure manner in order to preserve that entity's security and reputation.

20 Claims, 4 Drawing Sheets

(51) Int. Cl.
  *G06F 21/57* (2013.01)
  *G06F 16/22* (2019.01)
(52) U.S. Cl.
  CPC ........ *H04L 29/06965* (2013.01); *H04L 63/04* (2013.01); *H04L 63/1416* (2013.01); *H04L 63/1433* (2013.01); *H04L 67/1097* (2013.01); *H04L 63/166* (2013.01)

(56) References Cited

U.S. PATENT DOCUMENTS

| | | | |
|---|---|---|---|
| 2007/0061487 | A1 | 3/2007 | Moore et al. |
| 2007/0244981 | A1 | 10/2007 | Malden |
| 2011/0307555 | A1* | 12/2011 | Richardson ........... G06F 16/176 709/204 |
| 2015/0046744 | A1 | 2/2015 | Frerking |
| 2015/0106873 | A1 | 4/2015 | Marsh et al. |
| 2015/0207813 | A1* | 7/2015 | Reybok ................. H04L 63/145 726/22 |
| 2015/0222656 | A1* | 8/2015 | Haugsnes ........... H04L 63/1441 726/23 |
| 2015/0244681 | A1 | 8/2015 | Wolfinger et al. |

OTHER PUBLICATIONS

Connolly et al., "The Trusted Automated eXchange of Indicator Information (TAXII(™))," The Mitre Corporation, Aug. 11, 2012.
Davidson et al.,"The TAXII Services Specification Version 1.0 (draft)," The Mitre Corporation, Nov. 16, 2012.
"Standards and tools for exchange and processing of actionable information," ITU-T Draft: Study Period 2013-2016, International Telecommunication Union, Geneva CH, pp. 1-51, vol. 4/17, Jan. 26, 2015.
Supplementary European Search Report dated Nov. 21, 2018 as received in Application No. PCT/US2016/027516.
Notification of Deficiencies dated Sep. 25, 2019 issued in Israel Patent Application No. 255068 based on PCT/US2016/027516.
Homeland Security Systems Engineering and Development Institute, Threat Intelligence Sharing Using STIX and TAXII, Security 360 Speaker Slides 2014, May 14, 2014, pp. 1-33, URL:https// secure360.org/wp-conlent/uploads/2014/05/Threat-Intelligence-Sharing-using-STIX-and-TAXII.pdf
JPO Patent Office Official Action (Notice of Reason for Rejection) dated March 3, 2020 cited in co-pending Japanese Patent Application No. 2018-505577.
Multinational Alliance for Collaborative Cyber Situational Awareness, "CCSA Information Sharing Framework V2.4," 20 Nov. 2013 (retrieved from https://www.terena.org/mail-archives/refeds/ pdfjJz1CRtYC4.pdf on Apr. 30, 2020).
Burger et al., "Taxonomy Model for Cyber Threat Intelligence Information Exchange Technologies," Proceedings of the 2014 ACM Workshop on Information Sharing & Collaborative Security (WISCS '14), pp. 51-60 (Nov. 3, 2014).
EPO Communication pursuant to Article 94(3) EPC in Application No. 16 780 738.7, dated Mar. 27, 2020.

* cited by examiner

COMPUTERIZED SYSTEM AND METHOD FOR SECURELY DISTRIBUTING AND EXCHANGING CYBER-THREAT INFORMATION IN A STANDARDIZED FORMAT

CROSS-REFERENCE TO RELATED APPLICATION

This application claims the benefit under 35 U.S.C. § 119(e) of U.S. Provisional Patent Application No. 62/149,121, filed Apr. 17, 2015, which is herein incorporated by reference in its entirety.

TECHNICAL FIELD

The present invention pertains to computer-implemented systems and methods for allowing institutions to securely exchange, distribute, and receive cyber-threat information in a standardized format. More particularly, the present invention is directed to a) a system which allows cyber-threat information to be securely exchanged both between a central repository and distributed local repositories as well as directly between the distributed local repositories, and to b) a method of standardized and securely exchanging cyber-threat information between institutions.

BACKGROUND OF THE INVENTION

Over the past few decades, the world economy, including institutions and individuals alike, has grown dependent on computerized systems at an increasing rate. The amount of data generated by computer systems and users each day is already large (in 2012, approximately 2.5 exabytes per day) and the dependence of individuals and institutions on computer systems promises to grow even more with the recent proliferation of mobile devices, cloud computing, and the so-called "Internet of things."

While this increase computing power has yielded growing benefits in productivity and efficiency, it has also increased the incentives for bad actors (including hackers, cyber criminals, sophisticated organized crime outfits, and terrorists). These bad actors often seek to breach the security of computerized systems for a variety of different reasons. For example, such bad actors may seek to misappropriate personal information, obtain trade secrets from a corporation, uncover confidential government and military secrets, or compromise the crucial infrastructure of utilities.

These cyber-threats have not only increased in number, but also in their complexity and impact. An institution that has placed its data in a repository "in the cloud" now faces the prospect of having its information stolen and compromised by a hacker who gains access to that single repository. Firms who allow employees to use their personal mobile devices to access secure computerized systems can be vulnerable to malware introduced onto any one of those individuals' personal smartphones. As the potential damage that can be inflicted by a cyber-attack grows in magnitude, the ways in which a malicious entity can carry out that attack also increase.

While the cyber-attack threat faced by individuals and institutions can seem dire, an industry's defense against malicious actors can be a simple one: the open sharing of cyber-threat information between targeted individuals and institutions. A system for sharing and distributing cyber-threat information can act as an "immune system" for participating entities—by sharing the source and methods of a cyber-attack detected by one member, the remaining members of the system can be "vaccinated" against that cyber-threat vector, mitigating any future attacks. For example, a detected malicious IP address can be distributed to other users of the information-sharing system, who can then block that IP address from gaining access to their networks. A piece of detected malware's filename can be shared with other firms, who can then warn their employees not to download or install the malicious software on their personal devices. Therefore, even when a cyber-attacker succeeds, the sharing of information about that successful attack will assist in detecting and preventing any future attempts that cyber-attacker makes.

While the concept of threat-sharing seems simple enough, attempts to implement systems and methods to effectively combat cyber-threats through the sharing of threat information have been inadequate. For example, the Department of Homeland Security's Cybersecurity and Information Sharing and Collaboration Program (CISCP) has attempted to combat cyber-threats by publishing documents that share current security threats and system vulnerabilities, ways to combat and fix threats to systems, and best practices for the general public. While CISCP's suggestions and notifications are helpful, however, an entity must manually process the threats contained in each document and manually implement the remedies it identifies—a time-consuming and costly process. It is estimated that it takes an average of seven hours to process a single CISCP intelligence document, and that processing the entire CISCP document corpus would cost tens of millions of dollars per institution. As a result, participating entities only process and protect against a fraction of the cyber-threats published by CISCP.

Another example of an existing cyber-threat sharing network is the Research and Education Networking Information Sharing and Analysis Center (REN-ISAC), an international community of research and higher education institutions. Unfortunately, like CISCP, REN-ISAC's member colleges and universities have not automated the sharing and processing of threat information, because REN-ISAC does not share threat information in a standardized format. A member school can share threat information in whatever proprietary format it wishes, forcing other member institutions to undergo the time-consuming process of manually processing and acting on each piece of threat information.

Because of the increasing costs (both in time and financial resources) of manually processing the growing number of cyber-threats faced by organizations, what is needed is a way to automate the sharing and processing of cyber-threat information, as well as the implementation of defensive measures against identified cyber-threats. By automating the threat information sharing system, the power of these computing systems can be brought to bear against the malicious entities that threaten them. At the same time, however, because of the sensitive nature of cyber-threat attacks, it is desirable that institutions and individuals have the ability to control which detected cyber-threats they share, how they share them, and which other entities they share them with, in order to protect against sensitive and sometimes embarrassing disclosures which can damage their privacy, security, and reputation.

SUMMARY OF THE INVENTION

The present invention is directed, in certain embodiments, to computerized methods for distributing threat information, including creating, at a first repository for storing and distributing threat information, a first item describing an observed event or property in a common language, and distributing the first item to at least one other repository for storing and distributing threat information.

In certain embodiments of the invention, creating the first item includes converting an existing item that describes, in a customized language of the first repository, the observed event or property, into the first item describing the observed event or property in the common language.

In certain embodiments of the invention, the computerized methods further include converting the first item, at the least one other repository for storing and distributing threat information, into a second item describing the observed event or property in a customized language of the at least one other repository.

In certain embodiments of the invention, the common language is the STIX language, and the first item is distributed in accordance with the TAXII specification. In certain further embodiments of the invention, the first item contains descriptions of, for example, an observed event or property; a pattern of relevant observed activity; a set of related system or network activity associated with the observed event or property; a representation of the behavior or modus operandi of an entity responsible for the observable event or property; a vulnerability, weakness, or configuration issue of a potential victim of the observable event or property; a particular action that could be taken to prevent, mitigate, or remediate the effects of the observable event or property; related activities executed by the entity responsible for the observable event or property; and an entity responsible for causing the observable event or property.

In certain embodiments of the invention, distributing the first item includes transmitting the first item to a plurality of other repositories, and the first repository and the plurality of other repositories are members of an access control group.

In certain embodiments of the invention, the computerized methods further include manually analyzing or automatically analyzing the first item at the at least one other repository. In certain further embodiments of the invention, automatically analyzing the first item includes automatically determining whether to implement a response to the observed event or property.

In certain embodiments of the invention, the computerized methods further include analyzing, at the first repository for storing and distributing the threat information, a plurality of observed events or properties. In certain further embodiments of the invention, the computerized methods further include determining, from the analysis of the plurality of items describing the plurality of observed events or properties, at least one piece of information selected from a group of different types of information that includes, for example: a representation of the behavior or modus operandi of an entity responsible for at least one of the observed events or properties; a vulnerability, weakness, or configuration issue of a victim of at least one of the observed events or properties; a particular action that could be taken to prevent, mitigate, or remediate the effects of at least one of the observed events or properties; the entity responsible for at least one of the observed events or properties; and a prediction of at least one future observed event or property. In certain further embodiments of the invention, the computerized methods further include adding the at least one piece of information to at least one of the plurality of items.

In certain embodiments of the invention, the computerized methods further include assigning a quality metric to the first item describing the observed event or property. In certain further embodiments of the invention, the reliability metric is automatically assigned and based on at least one of: an identity of an entity responsible for creating the first item describing the observed event or property; a type of the observed event or property; a set of related system or network activity associated with the observed event or property; and an entity responsible for causing the observed event or property.

The present invention is directed, in certain embodiments, to computerized systems for storing and distributing threat information, the systems including: a central repository for storing and distributing threat information, a plurality of local repositories for storing and distributing threat information, and a network connecting the central repository with the plurality of local repositories, wherein the network transmits items of threat information from at least one of the plurality of local repositories to the central repository, and transmits items of threat information from the central repository to at least one of the plurality of local repositories.

In certain embodiments of the invention, the central repository for storing and distributing threat information is connected to, for example, at least one of a private feed transmitting threat information to the central repository, a public feed transmitting threat information to the central repository, and a government feed transmitting threat information to the central repository.

In certain embodiments of the invention, at least one of the plurality of local repositories for storing and distributing threat information is connected to, for example, at least one of: a private feed transmitting threat information to the central repository, a public feed transmitting threat information to the central repository, and a government feed transmitting threat information to the central repository.

In certain embodiments of the invention, a first one of the plurality of local repositories transmits at least one item of threat information over the network via the central repository to at least a second one of the plurality of local repositories.

In certain embodiments of the invention, a first one of the plurality of local repositories transmits at least one item of threat information over the network directly to at least a second one of the plurality of local repositories.

The present invention is directed, in certain embodiments, to computerized systems for automatically exchanging threat information, including: a central server comprising at least one multi-core processor, wherein the central server hosts a central repository containing a plurality of centralized threat information, the central repository comprising a MongoDB database, and the central server has SSL certification; a plurality of distributed servers, wherein each of the distributed servers hosts a local repository containing a plurality of localized threat information; and wherein the central server synchronizes with each of the plurality of distributed servers by exchanging, using SSL encryption, at least a portion of the plurality of centralized threat information for at least a portion of the plurality of localized threat information.

In certain embodiments, at least a first distributed server of the plurality of distributed servers also synchronizes with at least a second distributed server of the plurality of distributed servers by exchanging, using SSL encryption, at least a portion of the plurality of localized threat information from the first distributed server's local repository for at least a portion of the plurality of localized threat information from the second distributed server's local repository.

The present invention is directed, in certain embodiments, to computerized methods for securely exchanging threat information, including, at a first distributed server: entering a first item of threat information in a machine-readable language, converting the first item of threat information from the machine-readable language into the STIX language, at a TAXII interface at the first distributed server, securely transmitting the converted first item of threat information to a centralized server using SSL encryption, at the TAXII interface at the first distributed server, receiving a second item of encrypted threat information, wherein the second item is in the STIX language and has been encrypted using SSL encryption, validating the XML schema of the second item in the STIX language, analyzing the second item of encrypted information in the STIX language, translating the second item from the STIX format into a machine-readable format, and inserting the translated second item into a local repository, wherein the local repository is a MongoDB database.

DETAILED DESCRIPTION OF THE INVENTION

As discussed above, an exemplary existing association for sharing threat information, such as REN-ISAC or CISCP, shares threat information by first manually processing a piece of threat information, and then distributing the processed threat information, (usually in a language or format that is customized and proprietary to that member) to other members of the sharing association. These other members must then translate the received piece of threat information from the customized language into one or more languages that those other members' systems can understand.

The present invention is directed to computerized methods and systems for storing and distributing threat information among a plurality of different repositories, wherein the information is distributed among and exchanged between those repositories in a common language. This distribution of threat information in a common language allows the member individuals, institutions, organizations, firms, and agencies that operate the different repositories to more effectively protect against and mitigate the effects of cyberattacks through the automated sharing of cyber threat information. One such system is the Financial Services-Information Sharing and Analysis Center's (FS-ISAC) Cyber Intelligence Repository. This repository is described in "Cyber Intelligence Sharing Vision," which is available at https://www.fsisac.com/sites/default/files/Avalanche%20One-Sheet%2020Nov2013.pdf, and which is fully incorporated by reference herein By gaining awareness of the types of cyberattacks that have already occurred, how they can be detected and recognized, and how these attacks can be either prevented (if they have not yet occurred) or mitigated (if they have already occurred), member entities of the threat information sharing system can limit the damage caused by these attacks or (in the best-case scenario) prevent them from happening entirely. Similarly, by gaining awareness of relevant malicious threat actors, their goals and objectives, their capabilities (in the form of the tactics, techniques, and procedures they have historically used), and the types of vulnerabilities, misconfigurations, or weaknesses those actors are likely to target, a member entity can prioritize which defensive measures to take by identifying likely threats and the actors behind those threats.

In some embodiments of the present invention, the systems and methods for sharing threat information are fully automated, and can not only automatically identify, filter, and respond appropriately to threat information received by other entities, but can also predict future threats (based on recognized patterns of behavior) and preemptively prescribe and apply appropriate preventative and defensive measures before threats have even been carried out anywhere within the system.

Figure 1:
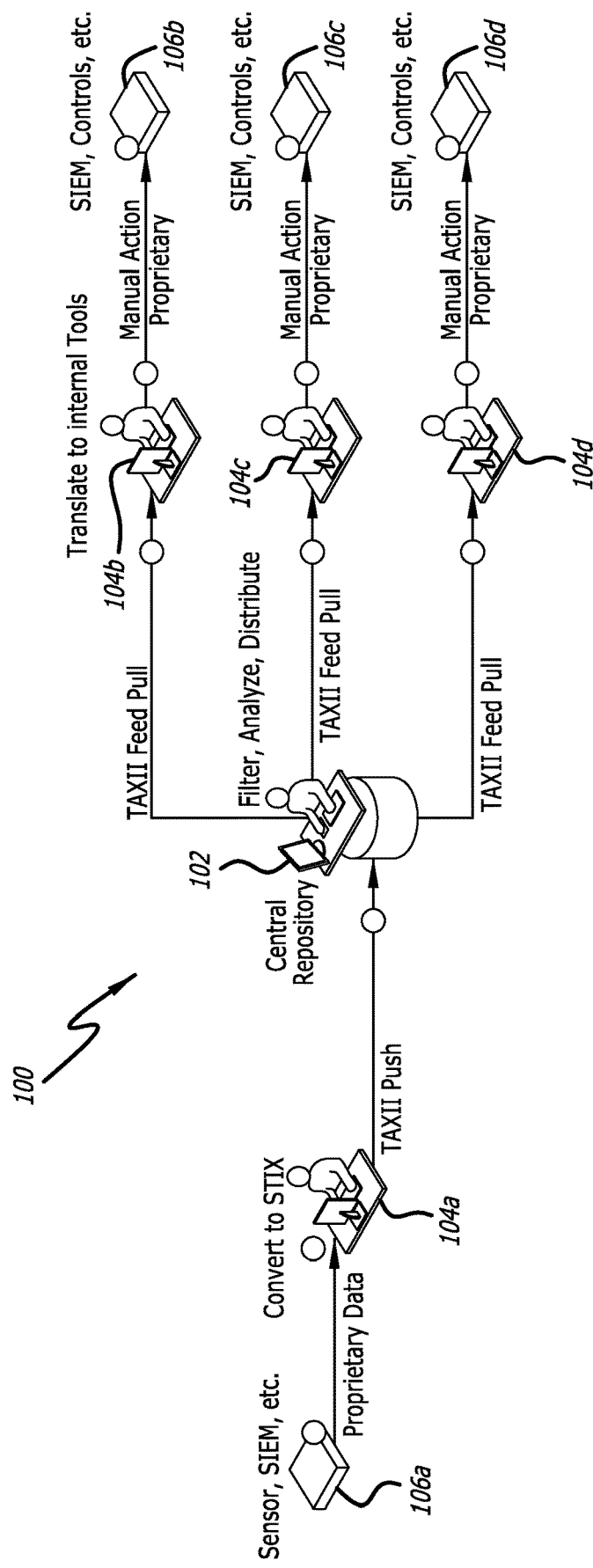
FIG. 1 is a diagram of a "hub & spoke" computerized system for sharing threat information.

FIG. 1 illustrates a first particular exemplary embodiment 100 of the threat information-sharing systems and methods of the present invention, known as a "hub & spoke system." In this type of system 100, one or more central repositories 102 and a plurality of users 104a, 104b, 104c, and 104d communicate items of threat information in a common language and distribute those items of threat information in accordance with a common specification.

The one or more central repositories 102 may each be hosted on one or more servers. In some embodiments of the invention, each server features at least one multi-core processor. In some embodiments of the present invention, the central repository 102 is a software image that is loaded onto and hosted by the one or more servers.

In some embodiments of the invention, the central repository 102 is a document-oriented, NoSQL database. In certain embodiments of the invention, the document-oriented, NoSQL database is a MongoDB database.

In the "hub & spoke" style system 100, the system features a plurality of member entities 104a, 104b, 104c, and 104d, in addition to central repository 102. In embodiments of the present invention, the central repository 102 is hosted on a centralized server, and each of the member entities 104a, 104b, 104c, and 104d are hosted on one or more distributed servers, and are connected to the central repository via a network such as the Internet.

The local entities 104a, 104b, 104c, and 104d in the system 100 include (but are not limited to) individuals, firms, government agencies, and associations. Each of the local entities 104a, 104b, 104c, and 104d receive items of threat information from one or more sensors and controls 106a, 106b, 106c, and 106d, respectively. In certain embodiments of the invention, these sensors and controls 106a, 106b, 106c, and 106d are security information and event management (SIEM) technology which can monitor, identify, and locate known and unknown cyberattacks and events in real time. Examples of such monitoring includes detection of intrusions, anomalies, and vulnerabilities.

When SIEM sensors and controls 106a, 106b, 106c, and 106d observe an event or property, in certain embodiments of the invention, these SIEM sensors and controls 106a, 106b, 106c, and 106d generate one or more items of threat information describing that event or property in a machine-readable customized language used by that particular local entity. These items of threat information may be automatically or manually generated at the local entities 104a, 104b, 104c, and 104d, and further details and metadata can be added to a particular item of information generated by the local entities 104a, 104b, 104c, and 104d.

After generating the one or more items of information, the local entities 104a, 104b, 104c, and 104d translate the items of threat information from the machine-readable, customized language into a common language used by the system 100 to describe items of threat information. Once translated, the items of threat information are then transmitted from each of the local entities 104a, 104b, 104c, and 104d to centralized repository 102 in accordance with a common specification for the transmission of information.

In certain embodiments of the invention, the items of threat information are transmitted in accordance with the common specification as well as a cryptographic protocol. In embodiments of the invention, the cryptographic protocol utilized by system 100 during the transmission of threat information is Secure Sockets Layer (SSL) or Transport Layer Security (TLS), and the central repository 102 is hosted on a centralized server that has SSL or TLS certification.

After receiving the items of threat information, in certain embodiments of the invention, the centralized repository 102 validates an XML schema of the one or more items of threat information described in the common language, and then filters and analyzes the received items of threat information. In certain embodiments, filtering the received items of threat information can include (but is not limited to) removing duplicate, inaccurate, or corrupted items of threat information and sorting and classifying received items of threat information to be organized, structured, and stored in central repository 102.

In embodiments of the present invention, the central repository 102's analysis of the received items of threat information includes (but is not limited to) comparing the received items of threat information to previously stored items of threat information, adding additional metadata to the received items of threat information, determining patterns in the received and stored items of threat information, forming and dissolving relationships between items of threat information, and making future predictions based on the received and stored items of threat information present at central repository 102.

For example, the analysis performed by central repository 102 may allow the central repository 102 to determine a representation of the behavior or modus operandi a representation of the behavior or modus operandi of an entity responsible for at least one of the multiple observed events or properties, a vulnerability, weakness, or configuration issue of a victim of at least one of the multiple observed events or properties, a particular action that could be taken to prevent, mitigate, or remediate the effects of at least one of the multiple observed events or properties, the entity responsible for at least one of the multiple observed events or properties; and/or a prediction of at least one future event or property connected to the already-observed items of threat information.

In certain embodiments of the present invention, this analysis may be automatically performed at central repository 102 by automated software or hardware tools. In other embodiments of the present invention, this analysis is performed by human analysts operating central repository 102, either with or without the assistance of computerized software and hardware tools.

In addition to analyzing the items of threat information that it has received and stored, the central repository 102 is also capable of distributing items of threat information to local entities 104a, 104b, 104c, and 104d.

In certain embodiments of the invention, central repository 102 distributes all the items of threat information stored at the repository 102 to local entities 104a, 104b, 104c, and 104d. In other embodiments of the invention, the central repository 102 is capable of determining unique subsets of the items of threat information to be distributed to each of local entities 104a, 104b, 104c, and 104d, respectively.

In some embodiments of the present invention, the items of threat information can be distributed from central repository 102 to local entities 104a, 104b, 104c, and 104d at the same time that local entities 104a, 104b, 104c, and 104d provide detected items of threat information to central repository 102 in a scheduled synchronization. In other embodiments of the present invention, the local entities 104a, 104b, 104c, and 104d "push" items of threat information to central repository 102 in real time as new items of threat information are generated, and "pull" items of threat information from central repository 102 on demand. Similarly, central repository 102 can "push" items of threat information to local entities 104a, 104b, 104c, and 104d as needed, and "pull" items of threat information from those local entities 104a, 104b, 104c, and 104d on demand.

Once items of threat information are received at local entities 104a, 104b, 104c, and 104d, these items of threat information can be translated into the customized, machine-readable language used by each of local entities 104a, 104b, 104c, and 104d, and provided to SIEM sensors and controls 106a, 106b, 106c, and 106d to allow those sensors and controls 106a, 106b, 106c, and 106d to implement remedial and preventive measures against the cyberthreats described and predicted in the received threat information.

Once a local entity 104a, 104b, 104c, or 104d receives an item of threat information, if that local entity 104a, 104b, 104c, or 104d desires more information or context about the item of threat information, the local entity may contact the entity who provided the item of threat information for further information. In some embodiments of the invention, however, the identity of the original entity/repository 104a, 104b, 104c, or 104d who provided the item of threat information is kept secure and anonymous, as the fact that an entity suffered a threat or attack may itself be sensitive, damaging, or embarrassing to that entity and/or its members.

In these embodiments, where the source of the item of threat information is anonymous, the local entity 104a, 104b, 104c, or 104d may send out a "request for information" ("RFI"), a message that includes a code or identifier associated with the item of threat information that is sent to all entities and/or repositories in the system. Because only the entity or repository that is the source of the message will contain that particular code/identifier, the RFI allows a way for entities in the system to request additional context, detail, or other information about an item of threat information while still preserving the anonymity of the original source of that item of threat information. In some embodiments, the source of the RFI will also be anonymous, even to the original source of the item of threat information that receives the RFI. In other embodiments, the source of the RFI is public and visible.

Figure 2:
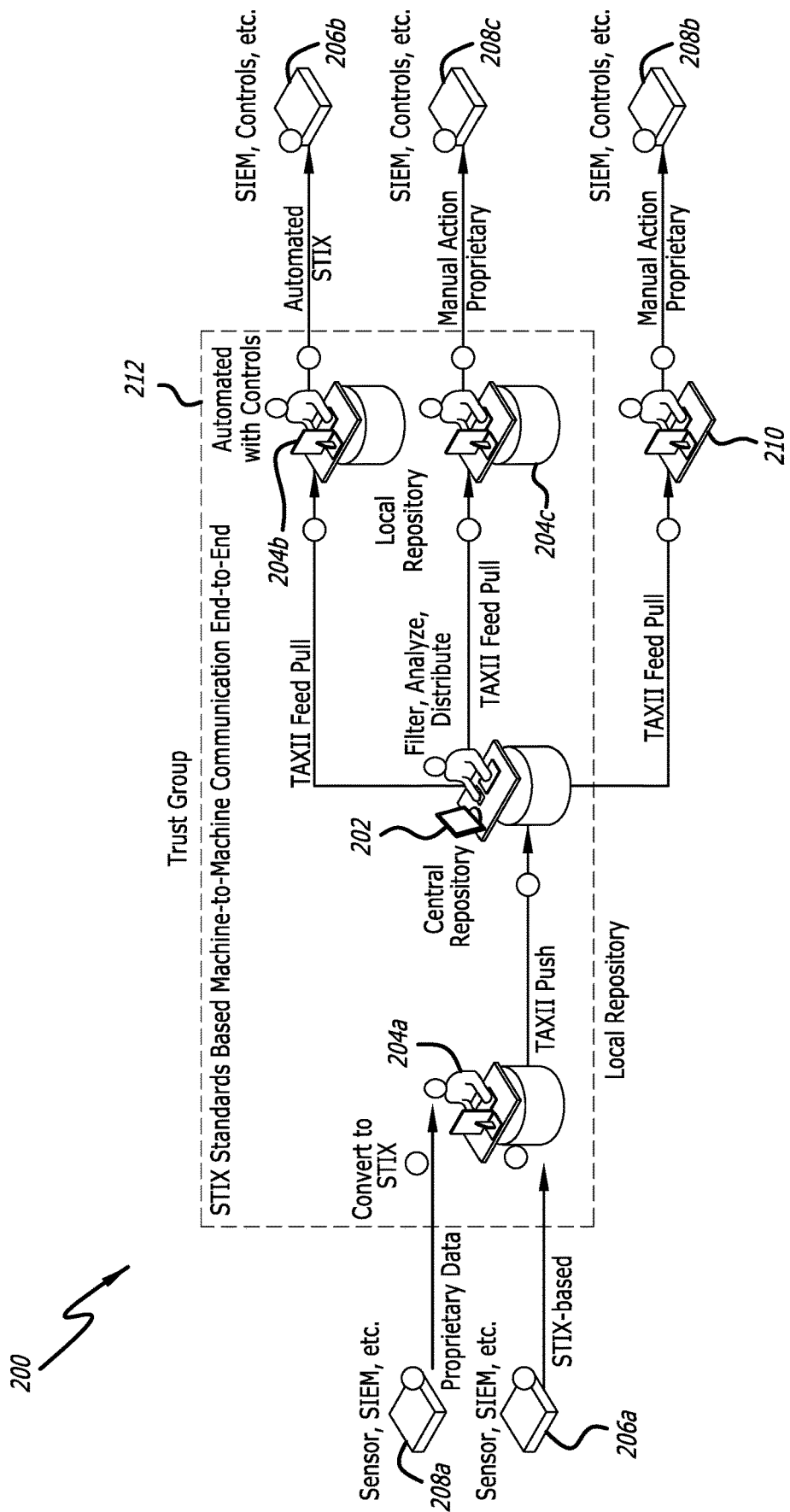
FIG. 2 is a diagram of a "hub & spoke" computerized system for sharing threat information that includes an access control group.

FIG. 2 illustrates a second exemplary embodiment 200 of the "hub & spoke system" that incorporates an "access control" or "trust" group 212, and local repositories 204a, 204b, and 204c. Like central repository 202, these local repositories 204a, 204b, and 204c are capable of storing, filtering, analyzing, and distributing items of threat information detected by SIEM sensors and controls 206a, 206b, 208a, 208b, and 208c.

In certain embodiments of the invention, some of the SIEM sensors and controls, such as 206a and 206b, generate and act on items of threat information in the common language of the threat information sharing system 200, instead of SIEM sensors and controls such as 208a, 208b, and 208c that generate and process items of threat information in customized, machine-readable languages. In these embodiments of the invention, local repositories such as 204a and 204b do not need to translate the information received from SIEM sensors and controls 206a and 206b before transmitting those items of threat information to central repository 202.

The "access control group" 212, sometimes known as a "trust group," defines a group of entities and/or repositories that are authorized to access certain categories of sensitive or private threat information that could, for example, embarrass an entity or damage that entity's privacy, reputation, operations, resources, or security. An entity may be a member of as many or as few access control groups 212 as necessary, with each access control group 212 designating a specific group of entities as being able to access information of varying privacy levels from the other entities in that group 212.

In this exemplary embodiment, access control group 212 includes local repositories 204a, 204b, and 204c and central repository 202, while excluding local entity 210. In this embodiment, a piece of threat information detected by local repository 204a, which would be damaging to the reputation of the institution operating 204a if it was revealed to the general public, would only be shared with repositories 202, 204a, and 204b, not with local entity 210, which falls outside of the access control group 212. In contrast, information detected by local repository 204a's SIEM sensors 206a and 208a which was not sensitive would be shared with all entities of system 200, including local entity 210.

In certain embodiments of the invention, the access control groups operate in accordance with the United States Computer Emergency Readiness Team's (US-CERT) Traffic Light Protocol (TLP). The TLP is described by "TLP: Traffic Light Protocol," which can be found at https://www.us-cert.gov/sites/default/files/TLP.pdf, and which is incorporated by reference herein in its entirety.

In these embodiments of the invention, the threat information-sharing systems of the present invention may include one or more "communities" of entities and/or repositories, wherein each community may contain one or more access control groups 212. The community may be created and or operated by one or more administrators. In these embodiments, the community may be a public community (a community visible to non-member entities and/or repositories and that does not require permission from an administrator to join), a private community (a community visible to non-member entities and/or repositories and that requires permission from an administrator to join), or a secret community (a community invisible to non-member entities and/or repositories that requires permission from an administrator to join).

In some embodiments, the one or more administrators of a community may customize the operation of the TLP for that particular community. For example, under the TLP standard, information coded as "RED" is not to be shared with any parties outside of the specific exchange, meeting, or conversation in which it was initially disclosed. Accordingly, in an exemplary embodiment, an administrator of a community may customize the TLP for that community so that an item of threat information coded "RED" is automatically rejected by the threat information-sharing system if a repository or entity attempts to distribute that item of threat information via the information-sharing system—automatically preventing accidental or unauthorized distribution of such sensitive information. In other exemplary embodiments, an administrator of a community may customize the TLP for that community so that items of threat information coded "YELLOW" or "AMBER" are automatically rejected by the information-sharing system if those items would be available for retrieval by entities or repositories who are not accessed to view those items of threat information.

Figure 3:
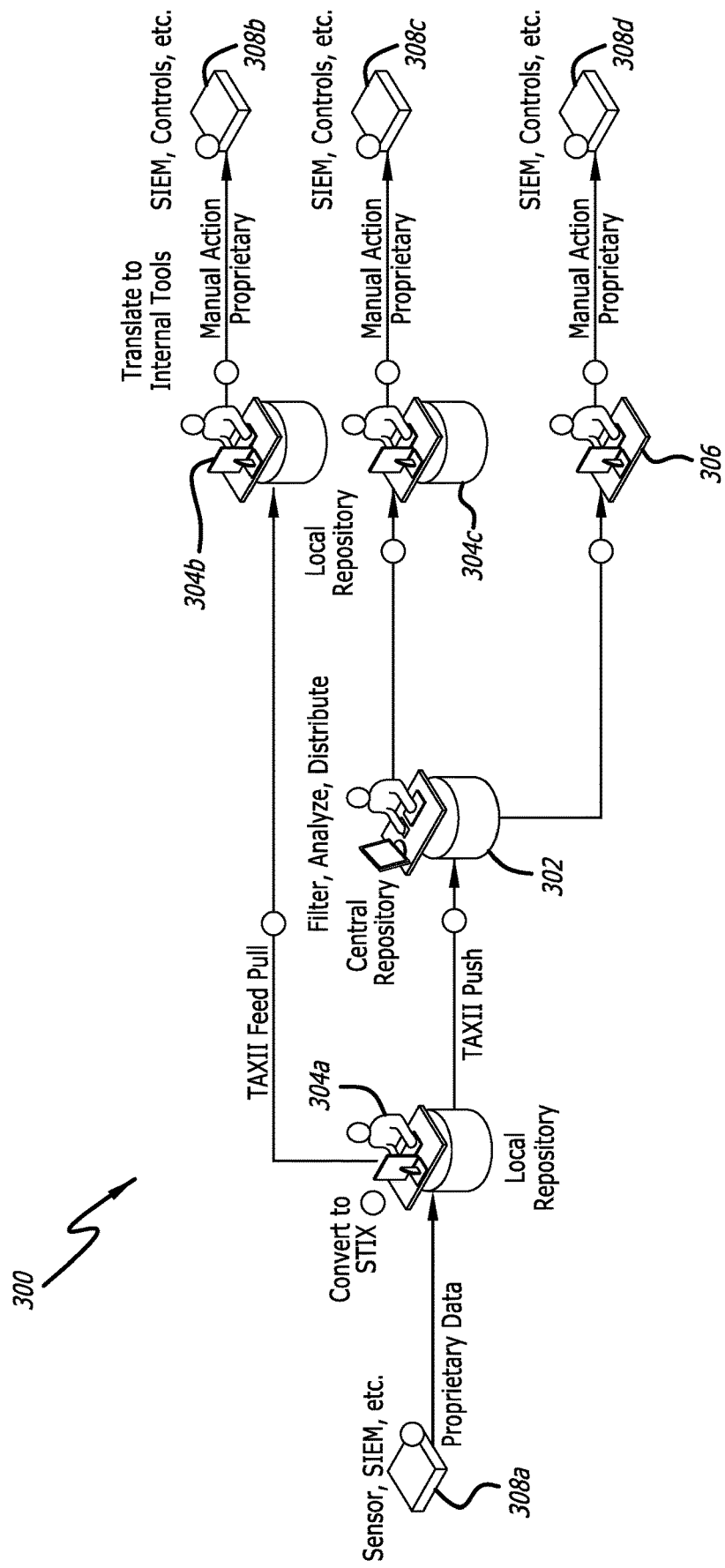
FIG. 3 is a diagram of a "hub & spoke" and "peer-to-peer" computerized system for sharing threat information.

FIG. 3 illustrates a third exemplary embodiment 300 of the threat information-sharing systems and methods of the present invention, known as a "hub & spoke" plus "peer-to-peer" system. In this exemplary system 300, the local repositories 304a, 304b, 304c, and local entity 306 can provide threat information detected by their SIEM sensors and controls 308a, 308b, 308c, and 308d to central repository 302, which can distribute the received items of threat information to the other local servers, in "hub & spoke" mode (as illustrated by FIGS. 1 and 2).

In addition to "hub & spoke" mode, however, exemplary threat information sharing system 300 can also operate in "peer to peer mode," where local repository 304a can share threat information directly with another local repository, such as repository 304b as illustrated by FIG. 3.

In some embodiments of the present invention, local repositories 304a and 304b can synchronize the threat information they contain at scheduled times. In other embodiments of the present invention, local repositories 304a and 304b may "push" or "pull" items of threat information to or from each other on demand, in real time. For example, local repository 304a may "push" multiple items of threat information directly to multiple other local repositories (such as 304b) simultaneously in peer-to-peer mode.

In certain embodiments of the invention, no centralized server is necessary, and the local repositories 304a, 304b, and 304c can operate entirely in peer-to-peer mode, exchanging threat information directly between themselves.

In some of the above-mentioned peer-to-peer embodiments of the invention, the local repositories 304a, 304b, and 304c may each publish their own "feed" of items of threat information to be accessed by other local repositories 304a, 304b, and 304c. In some embodiments, all or a subset of these feeds may be registered in a directory (not pictured) that allows an operator of a local repository 304a, 304b, or 304c to access a list of other local repository feeds to connect or subscribe to. In some embodiments, an operator of a local repository 304a, 304b, or 304c may browse through a list of all feeds registered in the directory; search for feeds in the directory that satisfy a set of search criteria; and/or view one or more feed(s) suggested by the directory itself based on the similarity of the operator's repository and the repositories that provide those suggested feeds. The operator can select one or more feeds from the registered directory to "subscribe" to, causing those one or more subscribed-to feeds to automatically "push" all or a subset of their published items of threat information to the operator's repository, or to cause the operator's repository to automatically "pull" all or a subset of the published items of threat information from the subscribed-to feeds.

Figure 4:
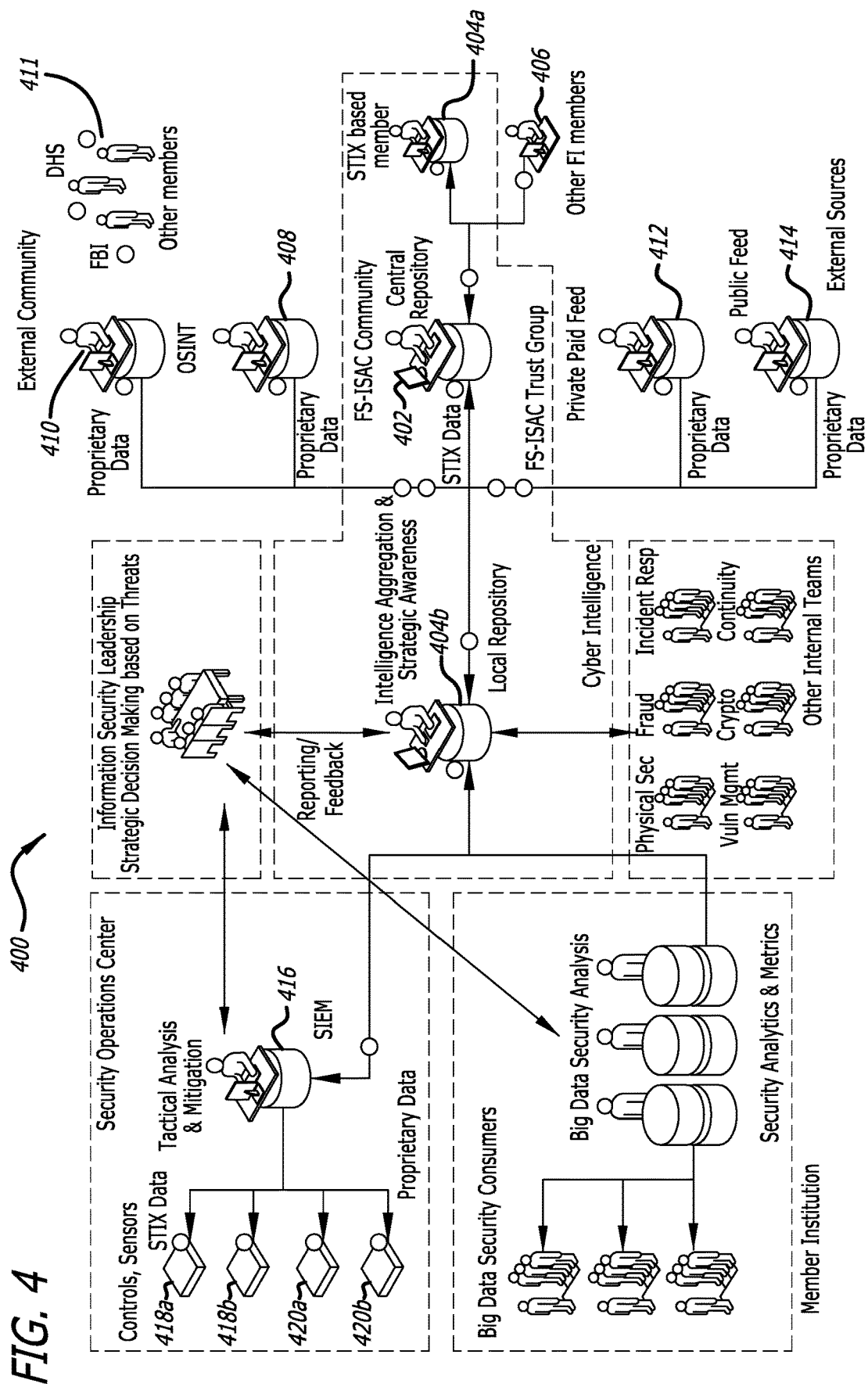
FIG. 4 is a diagram of a computerized system for sharing threat information.

FIG. 4 illustrates an exemplary embodiment of a computerized system 400 for sharing threat information. Central repository 402 is connected via a network to local repositories 404a and 404b, as well as to local entity 406.

In this exemplary system 400, in addition to the local repositories 404a and 404b, centralized server 402 is also connected via a network to public feed 414, which provides a publicly accessible source of threat information, and which is configured to transmit threat application to centralized server 402 via a network. Centralized server 402 is also connected to a private feed 412 which provides commercialized threat information in return for payment, as well as government feed 408, which provides threat information to those entities, such as 402, that have a sufficient national security clearance to receive the threat information. Local repositories 404a and 404b can also be directly connected with the public 414, private 412, and government 408 feeds.

In addition to the public 414, private 412, and government 408 feeds, centralized server 402 of information sharing system 400 is also connected to one or more centralized servers 410 of one or more other information sharing systems 411. For example, an information sharing system could be connected and share (at least some) threat information with an information system sharing system for defense institutions, a system for energy institutions, and/or a system for educational institutions.

Local repository 404b receives threat information from local SIEM controls and sensors 418a and 418b, which provide threat information in the common language utilized by system 400, as well as local SIEM controls and sensors 420a and 420b, which provide threat information in a machine-readable language that is custom to local repository 404b's SIEM analysis and mitigation tools 416.

In certain embodiments of the invention, the common language used by the plurality of repositories for storing and distributing threat information is the Structured Threat Information eXpression (STIX) language. The STIX language is described in "Standardizing Cyber Threat Intelligence Information with STIX," which can be found at http://stix.mitre.org/about/documents/STIX_Whitepaper_v1.1.pdf, and which is hereby incorporated by reference in its entirety.

In some embodiments, the STIX language is implemented using an eXtensible Markup Language (XML) Schema. However, other potential implementations have been envisioned, including possibilities such as semantic web (RDF/OWL), JSON-centric, and ProtocolBuffers implementations.

The STIX language conveys structured cyber-threat information by describing observed events or properties using an architecture made up of a number of different types of "constructs," each of which represents a different aspect of cyberthreat information. Each construct is interrelated with the other constructs, and provides a different set of details of cyberthreat information.

The "base" construct of the STIX language is the "Observable." Observables are stateful properties or measurable events pertinent to the operation of computers and networks. Examples of Observables include (but are not limited to): information about a file (such as the filename, hash, or size), a registry key value (or the creation or deletion of a key), a service being started or changed, an HTTP request being sent (or received), an email being received (or sent), network traffic on specific IP addresses, or communication on certain ports. In certain embodiments, STIX utilizes the Cyber Observable eXpression schema (CybOX) to represent Observables.

CyBOX is a schema for encoding and communicating standardized high-fidelity information about cyber observables. The CyBOX scheme is described in "Cyber Observable eXpression—CybOX: A Structure Language for Cyber Observables," which can be found at http://makingsecuritymeasurable.mitre.org/docs/cybox-intro-handout.pdf, and which is incorporated by reference herein in its entirety.

Another construct in the STIX language is the "Indicator." An Indicator conveys information about specific patterns of Observables, combined with contextual information, which is intended to represent behaviors of interest within the cybersecurity context. An Indicator consists, for example, of one or more patterns of Observables that can potentially be mapped to a Tactics, Techniques and Procedures (TTP) (another type of construct) context. The Indicator can include (but is not limited to) metadata describing confidence in the Indicator's assertion, handling restrictions, valid time windows, likely impact, sightings of the Indicator, structured test mechanisms for detection, related campaigns, suggested courses of action, related Indicators, and the Indicator's source.

Another construct in the STIX language is the "Incident." Incidents are discrete instances in which an Indicator affects an organization, along with information discovered or decided during the investigation into how to respond to the Incident. Incidents include (for example), data such as time-related information, parties involved in the Incident, assets affected by the Incident, an assessment of the impact of the Incident, related Indicators, related Observables, one or more TTP's leveraged in the Incident, one or more attributed Threat Actors (another type of construct), intended effects, the nature of what (if any) was compromised in the Incident, the responsive Course of Action (another type of construct) taken, the confidence in the characterization in the incident, guidance on handling the incident, the source of the Incident information, and a log of actions taken during and in response to the Incident.

Another construct is Tactics, Techniques, or Procedures (TTP), which are representations of the behavior or modus operandi of cyber adversaries. This construct contains information characterizing what an adversary does in varying levels of detail. Information contained within a TTP construct includes (but is not limited to) the specific adversary behavior exhibited (e.g., attack patterns, malware, exploits), the resources leveraged (e.g., tools, infrastructure, persons), information on the victims targeted (e.g., who, what, and where), the relevant ExploitTargets (another type of construct) being targeted, the intended effects of the behavior, relevant "kill chain" phases, handling guidance, and the source of the TTP information.

For illustrative purposes, an example of a TTP includes using malware to steal credit card credentials by sending targeted emails to potential victims with attached documents containing malicious code which executes upon opening, capturing credit card information from keystrokes using that code, and using http to communicate with a command and control server to transfer the credit card information. Another example is identifying potentially gullible individuals through open source research, crafting socially engineered emails and documents accompanied by malware that will bypass current antivirus detection, and establishing a command and control server and e-mail account that will convince those individuals of the authenticity of those documents/e-mails.

In certain embodiments of the invention, the CybOX scheme may be utilized for characterization of TTP tools and infrastructure. In other embodiments of the invention, the Malware Attribute Enumeration and Characterization (MAEC) language may be used to characterize TTP malware. The MAEC language is described in "The MAEC Language: Overview," which can be found at http://maec.mitre.org/about/docs/MAEC_Overview.pdf, and which is incorporated by reference herein in its entirety. In other embodiments of the invention, the Common Attack Pattern Enumeration and Classification (CAPEC) schema is used to characterize TTP attack patterns. The CAPEC scheme is described in "Common Attack Pattern Enumeration and Classification—CAPEC," which can be found at http://makingsecuritymeasurable.mitre.org/docs/capec-intro-handout.pdf, and which is incorporated by reference herein in its entirety.

Another construct in the STIX language is the Campaign, which represents an instance of one or more ThreatActors (another type of construct) pursuing an objective, as observed through sets of Incidents and/or TTPs, and possibly across organizations. The information contained within a Campaign construct may include (but is not limited to) the suspected intended effect of the one or more ThreatActors, the related TTPs utilized within the Campaign, the one or more Incidents believed to be part of the Campaign, the one or more ThreatActors to who the Campaign is believed to be attributed, other Campaigns believed to be related to the particular Campaign, confidence in the identification of the intent and characterization of the Campaign, activities taken in response to the Campaign, the source(s) of the information about the Campaign, and guidance in handling the Campaign and its component Incidents.

Another construct in the STIX language is the ThreatActor, which is a characterization of one or more malicious actors or adversaries responsible for a cyberattack threat, including the presumed intent of these actors and their historically observed behavior. The information within a ThreatActor construct includes (but is not limited to) a characterization of the ThreatActor's identity, the suspected motivation of the ThreatActor, one or more historical (or present) Campaigns believed to be associated with the ThreatActor, other ThreatActors believed or known to be associated with the ThreatActor, handling guidance, confidence in the asserted characterization of the ThreatActor, and the source of the ThreatActor information.

Another construct in the STIX language is the ExploitTarget, which represents a potential vulnerability or weakness in software, systems, networks, or configurations that can be (or have been) targeted by exploitation by a TTP of a ThreatActor. ExploitTargets can include (but are not limited to) vulnerability identifications or characterizations, weakness identifications or characterizations, configuration identifications or characterizations, one or more potential CoursesOfAction (another type of construct), the source of the information about an ExploitTarget, and handling guidance.

In certain embodiments of the invention, publicly disclosed vulnerabilities are identified using the Open Source Vulnerability Database (OSVDB) and the identifier constructs from the Common Vulnerabilities and Exposures (CVE) dictionary. In certain embodiments of the invention, the Common Vulnerability Reporting Framework (CVRF) framework is used to detail the structural characterization of vulnerabilities that have not yet been publicly identified (so-called "zero-day exploits"), the Common Weakness Enumeration (CWE) is used for the identification of weaknesses, and the Common Configuration Enumeration (CCE) is used for the identification of configuration issues.

Another construct in the STIX language is a CourseOfAction (COA), which is a representation of one or more specific measures to be taken to address cyberthreats. A COA can be corrective (acting to address a cyberthreat which has already occurred) or preventative (forward-looking, acting to prevent a future cyberthreat which has not yet occurred) either to address one or more ExploitTargets or to counter or mitigate the impacts of Incidents. A COA includes (but is not limited to) its relevant stage in cyberthreat management (e.g., remedy of an ExploitTarget or response to an Incident), the type of the COA, a description of the COA, the objective of the COA, the structured representation of the COA (such as an IPS rule or automated patch or remediation), the likely impact of the COA, the likely cost of the COA, the estimated efficacy of the COA, observable parameters of the COA, and handling guidance.

While various specific pieces of information contained within each type of construct, as well as various interrelationships between the constructs, have been described above, these are merely exemplary descriptions, as the constructs in the STIX language are independent, flexible, and reusable. Each type of STIX construct may be related to as few (including zero) or to as many other STIX constructs as required by the context of the particular cyberthreat environment that it describes. Additionally, each STIX construct may contain as few (or as much) information, and types of information, that is necessary to describe the particular property or item that it characterizes.

In certain embodiments of the invention, a quality metric, or quality score, can be automatically assigned to a STIX language construct. This quality metric is a measure of the validity and accuracy of the information contained within the STIX language construct, and can automatically be assigned to the construct by a repository that provides the construct (or a repository that receives the construct), or can be manually assigned by a user of the threat information sharing system.

In certain embodiments of the invention, the quality metric is based on a confidence metric, or confidence score that has been automatically or manually assigned to the STIX language construct. The confidence metric can be based on factors including (but not limited to) an identity of the entity who was responsible for creating the first item describing the observed event or property, a type of the observed event or property, a set of related system or network activity associated with the observed event or property, and an entity responsible for causing the observed event or property.

For example, there may be a high confidence metric and quality metric that the information contained in a construct is accurate and valid if the entity that first observed a threat has a long historical record of accurately characterizing cyberattacks, the construct describes a type of threat that is common and easily identified, there are a number of similar threats that have recently occurred and have also been identified and confirmed, and the malicious entity that has been identified to be responsible for the cyberthreat has a long, well-known historical record of perpetrating similar cyberthreats.

In contrast, if the entity that identified the cyberthreat has just joined the information-sharing network and has no history of correctly identifying cyberthreats (or, conversely, if that entity has been a member for a long time and has a terrible record of accuracy in identifying cyberthreats), the confidence and quality metrics for that STIX language construct will be relatively low. Similarly, low confidence/quality metrics may result if a cyberthreat is of a type that has never been seen before or that is poorly understood, or if the malicious actor responsible for the cyberthreat has never before been seen or has a reputation for unpredictable or chaotic behavior.

In certain embodiments of the invention, member entities may choose to respond to constructs with low confidence/quality scores by not automatically responding to the threat information or by filtering out the low-quality threat information altogether so that it is ignored. Conversely, member entities may choose to respond to constructs with high confidence/quality scores by automatically implementing a response to the information or flagging the information for further analysis.

In some embodiments of the present invention, a repository may store and generate threat information in the STIX language. In other embodiments of the present invention, a repository may generate or store threat information in a customized or proprietary machine-readable format, which must be parsed into the STIX language before transmitting the threat information, or from the STIX language after receiving the threat information, to ensure compatibility with the other repositories in the information-sharing system. In some embodiments, some information generated or stored by the repository will be in the STIX language, whereas other information will be generated or stored in the customized or proprietary machine-readable format in the same repository. While the information generated or stored in the STIX language can be transmitted to other repositories without further processing, the information generated or stored in the customized or proprietary format will have to be translated into the STIX language before transmittal to other repositories.

Because of the volume of data that is generated and processed through the information-sharing systems of the present invention, the system and/or local repositories may pre-digest/pre-process and index the threat information to assist in access to and querying of the items of threat information.

In certain embodiments of the invention, the one or more items describing an observed event or property are distributed between repositories for storing and distributing threat information using the Trusted Automated eXchange of Indicator Information (TAXII) specification.

The TAXII specification is described in "TAXII Overview, Version 1.1," which can be found at http://taxii.mitre.org/specifications/version1.1/TAXII_Overview.pdf, "The TAXII Services Specification, Version 1.1," which can be found at http://taxii.mitre.org/specifications/version1.1/TAXII_Services_Specification.pdf, "The TAXII HTTP Protocol Binding Specification, Version 1.0," which can be found at http://taxii.mitre.org/specifications/version1.0/http1.0/TAXII_HTTPProtocolBinding_Specification.pdf, and the "TAXII XML Message Binding Specification, Version 1.1," which can be found at http://taxii.mitre.org/specifications/version1.1/TAXII_XMLMessageBinding_Specification.pdf. All of these documents are hereby incorporated by reference in their entirety.

The TAXII specification defines a set of services and message exchanges (e.g., concepts, protocols, and messages) which enable sharing of items of threat information between members. TAXII's services and message exchanges are defined separately from the details of the system for sharing threat information's implementation of network protocols, message formats, content types, and query types. This allows members to join the system who do not necessarily share the same types of network protocols or message formats as other members. While two members using different network protocols or message formats may not be able to communicate directly to each other, if they both utilize TAXII messages and services, they can still communicate through a TAXII gateway, allowing those two members to exchange threat information.

An entity (such as a person, an organization, an agency, a firm) that is the source of an item of threat information is defined in the TAXII specification as a "Producer." An entity that is the recipient of an item of threat information is defined in the TAXII specification as a "Consumer." These roles are not mutually exclusive, and an entity can be both a producer and a consumer of threat information in the TAXII specification.

The TAXII specification requires several different "functional units." Each functional unit is a component with a defined role in the TAXII specification, but separate software/hardware is not needed for each functional unit—a single software or hardware application could encompass multiple functional units, or multiple applications could cooperate to serve as a single functional unit.

One functional unit is the TAXII Transfer Agent (TTA), a network-connected functional unit that sends and/or receives TAXII messages and interacts with other TTA's over the network. Another functional unit is the TAXII Message Handler (TMH), a functional unit that produces and consumes TAXII messages by parsing inbound TAXII messages and constructing outbound TAXII messages. The TMH provides TAXII messages to the TTA to be transmitted over the network, and the TTA provides TAXII messages from the TMH that were received by the TTA from other TTA's over the network. This configuration allows the TTA to handle the details of the network protocol (of which the TMH can be unaware), and the TMH to handle the details of the content of the TAXII messages (of which the TTA can be unaware).

The TAXII specification describes all TAXII functional units of a single Producer or Consumer in the TAXII system as a "TAXII Architecture." A TAXII Architecture includes a TTA, a TMH, and the "TAXII Back-end," which includes all functional units in the TAXII Architecture outside of the TTA and the TMH. These functional units can be responsible for tasks including (but not limited to) data storage, subscription management, access control decisions, and filtering of content prior to dissemination. The TAXII specification does not dictate requirements as to how these capabilities are implemented in the TAXII Back-end, except for noting that the TAXII Back-end must be compatible with the TMH. This flexibility allows individual implementers of the TAXII specification to decide which TAXII Back-end capabilities are necessary for their entity, and how they wish to implement those capabilities in their repository.

In some embodiments of the present invention, the functional units within the TAXII Back-end may store, receive, and generate threat information content in a format that is already compatible with the TAXII messages sent and received by the TMH. In other embodiments of the present invention, the functional units of the TAXII Back-end may generate or store threat information in a customized or proprietary format, which must be parsed to ensure compatibility with the TAXII messages sent and received by the TMH. In some embodiments, some information generated or stored by the TAXII Back-end may be TAXII-compatible, whereas other information will be generated or stored in the customized or proprietary format in the same TAXII Back-end and will have to be processed to ensure TAXII compatibility when that information is transmitted to or from the TMH.

Embodiments of the present invention have been described for the purpose of illustration. Persons skilled in the art will recognize from this description that the described embodiments are not limiting, and may be practiced with modifications and alterations limited only by the spirit and scope of the appended claims which are intended to cover such modifications and alterations, so as to afford broad protection to the various embodiments of the invention and their equivalents.

The invention claimed is:

1. A computerized method for distributing threat information, comprising:

providing a network connecting a central repository to a plurality of local repositories, each local repository is in communication with a sensor;

generating threat information in a customizable machine readable language with a sensor based on an observed event;

creating a first item describing the threat information by converting the machine readable language into a common language at one of the plurality of local repositories;

pushing the first item from one of the plurality of local repositories to the central repository for storing the first item and distributing the first item from the central repository to the plurality of other local repositories; and pushing the first item from the first local repository directly to another local repository in the network, wherein each of the plurality of local repositories are configured to push the first item to another local repository in the network, and each of the plurality of local repositories are configured to pull the first item from another local repository in the network.

2. The computerized method of claim 1 further comprising: converting the first item, at the at least one other repository for storing and distributing threat information, into a second item describing the observed event or property in a customized language of the at least one other repository.

3. The computerized method of claim 1, wherein the common language is the STIX language, and the first item is distributed in accordance with the TAXII specification.

4. The computerized method of claim 3, wherein the first item contains descriptions of one or more of: (a) an observed event or property; (b) a pattern of relevant observed activity; (c) a set of related system or network activity associated with the observed event or property; (d) an entity responsible for causing the observed event or property; (e) a representation of the behavior or modus operandi of the entity responsible for the observed event or property; (f) a vulnerability, weakness, or configuration issue of a potential victim of the observed event or property; (g) a particular action that can be taken to prevent, mitigate, or remediate the effects of the observed event or property; and (h) related activities executed by the entity responsible for the observed event or property.

5. The computerized method of claim 1, further comprising manually analyzing or automatically analyzing the first item at the at least one other repository.

6. The computerized method of claim 5, wherein automatically analyzing the first item comprises automatically determining whether to implement a response to the observed event or property.

7. The computerized method of claim 6, further comprising automatically implementing a response to the observed event or property.

8. The computerized method of claim 1, further comprising analyzing, at the first repository for storing and distributing the threat information, a plurality of items describing a plurality of observed events or properties.

9. The computerized method of claim 8, further comprising determining, from the analysis of the plurality of items describing the plurality of observed events or properties, at least one piece of information selected from the group comprising: (a) a representation of the behavior or modus operandi of an entity responsible for at least one of the plurality of observed events or properties; (b) a vulnerability, weakness, or configuration issue of a victim of at least one of the plurality of observed events or properties; (c) a particular action that could be taken to prevent, mitigate, or remediate the effects of at least one of the plurality of observed events or properties; (d) the entity responsible for at least one of the plurality of observed events or properties; and (e) a prediction of at least one future observed event or property.

10. The computerized method of claim 9, further comprising adding the at least one piece of information to at least one of the plurality of items.

11. The computerized method of claim 1, further comprising assigning a quality metric to the first item describing the observed event or property.

12. The computerized method of claim 11, wherein the quality metric is automatically assigned or manually assigned to the first item, and the quality metric is based on at least one confidence metric previously assigned to the first item.

13. The computerized method of claim 12, wherein the at least one confidence metric was automatically assigned or manually assigned to the first item, and the confidence metric is based on at least one of: (a) an identity of an entity responsible for creating the first item describing the observed event or property; (b) a type of the observed event or property; (c) a set of related system or network activity associated with the observed event or property; and (d) an entity responsible for causing the observed event or property.

14. A computerized system for storing and distributing threat information, comprising:

a central repository for storing and distributing threat information;

a plurality of local repositories for storing and distributing threat information, each local repository is capable of generating threat information in a customizable machine readable language based on an observed event, creating a first item describing the threat information by converting the machine readable language into a common language, pushing the first item to the central repository, and pushing the first item directly to one local repository, each of the plurality of local repositories are configured to push the first item to another local repository, and each local repository is configured to pull threat information from another local repository; and a network connecting the central repository with the plurality of local repositories, wherein the network allows transmission of the first item from at least one of the plurality of local repositories to the central repository, transmission of the first item from the central repository to the plurality of local repositories, and transmission of the first item from at least one of the plurality of local repositories directly to one other local repository.

15. The computerized system of claim 14, wherein the central repository for storing and distributing threat information is connected to at least one of: (a) a private feed configured to transmit threat information to the central repository; (b) a public feed configured to transmit threat information to the central repository; and (c) a government feed configured to transmit threat information to the central repository.

16. The computerized system of claim 14, wherein at least one of the plurality of local repositories for storing and distributing threat information is connected to at least one of: (a) a private feed configured to transmit threat information to the central repository; (b) a public feed configured to transmit threat information to the central repository; and (c) a government feed configured to transmit threat information to the central repository.

17. The computerized system of claim 14, wherein a first one of the plurality of local repositories is configured to transmit at least one item of threat information over the network via the central repository to at least a second one of the plurality of local repositories.

18. The computerized system of claim 14, wherein a first one of the plurality of local repositories is configured to transmit at least one item of threat information over the network directly to at least a second one of the plurality of local repositories.

19. The computerized system of claim 14, wherein each local repository is capable of pushing threat information to another local repository in real time and each local repository is capable of pulling threat information from another local repository in real time.

20. The computerized system of claim 14, wherein each local repository is capable of pushing threat information to another local repository at a scheduled time and each local repository is capable of pulling threat information from another local repository at a scheduled time.

* * * * *

UNITED STATES PATENT AND TRADEMARK OFFICE
CERTIFICATE OF CORRECTION

PATENT NO. : 10,686,828 B2
APPLICATION NO. : 15/098977
DATED : June 16, 2020
INVENTOR(S) : Michael Aharon Chernin et al.

It is certified that error appears in the above-identified patent and that said Letters Patent is hereby corrected as shown below:

On the Title Page

In Item (73), the Assignee "SOLTRA SOLUTIONS, LLC, Tampa, FL (US)" should be changed to --NC4 Soltra LLC, El Segundo, CA (US)--.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*